United States Patent
Huang et al.

(10) Patent No.: US 10,990,267 B2
(45) Date of Patent: *Apr. 27, 2021

(54) TWO STEP CONTENT SELECTION

(71) Applicant: Microsoft Corporation, Redmond, WA (US)

(72) Inventors: Jerry Huang, Beijing (CN); Zhen Liu, Tarrytown, NY (US); Chiu Chun Bobby Mak, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/074,753

(22) Filed: Nov. 8, 2013

(65) Prior Publication Data

US 2015/0135112 A1    May 14, 2015

(51) Int. Cl.
| | | |
|---|---|---|
| G06F 3/0486 | (2013.01) | |
| G06F 3/0484 | (2013.01) | |
| G06F 3/0483 | (2013.01) | |
| G06F 40/166 | (2020.01) | |
| G06F 3/0488 | (2013.01) | |

(52) U.S. Cl.
CPC .......... *G06F 3/0486* (2013.01); *G06F 3/0483* (2013.01); *G06F 3/0484* (2013.01); *G06F 3/0488* (2013.01); *G06F 3/04842* (2013.01); *G06F 40/166* (2020.01); *G06F 2203/04805* (2013.01)

(58) Field of Classification Search
CPC ...... G06F 3/0486; G06F 3/048; G06F 3/0484; G06F 3/0488; G06F 40/166; G06F 3/04842; G06F 3/0483; G06F 2203/04805

USPC .......................................................... 715/770
See application file for complete search history.

(56) References Cited

U.S. PATENT DOCUMENTS

| | | | |
|---|---|---|---|
| 7,496,230 | B2 | 2/2009 | Chen et al. |
| 7,877,685 | B2 | 1/2011 | Peters |
| 8,201,109 | B2 | 6/2012 | Van Os et al. |
| 8,370,736 | B2 | 2/2013 | Ording et al. |

(Continued)

FOREIGN PATENT DOCUMENTS

| | | |
|---|---|---|
| CN | 101031914 A | 9/2007 |
| CN | 101604243 A | 12/2009 |

(Continued)

OTHER PUBLICATIONS

"Second Written Opinion Issued in PCT Application No. PCT/US2014/064483", dated Oct. 2, 2015, 7 Pages.

(Continued)

*Primary Examiner* — Phuong H Nguyen
(74) *Attorney, Agent, or Firm* — Medley, Behrens & Lewis, LLC

(57) ABSTRACT

In a first step of a two step content selection operation, initial content can be selected by detecting movement of a content selection object with respect to a computing device. The selection area can be calculated based on the object movement that is detected. The content within the selection area can be selected and displayed in a second display area overlaying the original content. The initial content can be copied into the second display area. All or part of the initial content can be enlarged, enabling the second step of the selection operation in which a subset of the initial content is selected.

20 Claims, 14 Drawing Sheets

(56) References Cited

U.S. PATENT DOCUMENTS

| | | |
|---|---|---|
| 2003/0101044 A1 | 5/2003 | Krasnov |
| 2004/0019611 A1 | 1/2004 | Pearse et al. |
| 2005/0052427 A1 | 3/2005 | Wu et al. |
| 2006/0036945 A1 | 2/2006 | Radtke et al. |
| 2006/0075353 A1 | 4/2006 | DeSpain et al. |
| 2006/0277481 A1 | 12/2006 | Forstall et al. |
| 2007/0226646 A1* | 9/2007 | Nagiyama ............... G06F 3/016 715/784 |
| 2009/0109243 A1* | 4/2009 | Kraft ..................... G06F 3/0481 345/660 |
| 2009/0125848 A1 | 5/2009 | Keohane et al. |
| 2009/0228792 A1 | 9/2009 | van Os et al. |
| 2009/0228842 A1 | 9/2009 | Westerman et al. |
| 2009/0300554 A1* | 12/2009 | Kallinen ............. G06F 3/04883 715/863 |
| 2010/0235726 A1 | 9/2010 | Ording et al. |
| 2011/0219323 A1 | 9/2011 | Woo et al. |
| 2011/0231796 A1 | 9/2011 | Vigil |
| 2011/0239110 A1 | 9/2011 | Garrett et al. |
| 2011/0289406 A1 | 11/2011 | Wassingbo |
| 2011/0307843 A1 | 12/2011 | Miyazaki et al. |
| 2011/0320978 A1 | 12/2011 | Horodezky et al. |
| 2012/0044173 A1 | 2/2012 | Homma et al. |
| 2012/0081317 A1 | 4/2012 | Sirpal et al. |
| 2012/0089942 A1* | 4/2012 | Gammon ................ G06F 3/048 715/784 |
| 2012/0216113 A1 | 8/2012 | Li |
| 2012/0218205 A1 | 8/2012 | Park |
| 2012/0218307 A1 | 8/2012 | Lin et al. |
| 2012/0249595 A1 | 10/2012 | Feinstein |
| 2012/0268388 A1 | 10/2012 | Razzaghi |
| 2012/0306772 A1 | 12/2012 | Tan et al. |
| 2013/0014054 A1* | 1/2013 | Choi ....................... G06F 17/24 715/810 |
| 2013/0021259 A1 | 1/2013 | Sudo et al. |
| 2013/0042199 A1 | 2/2013 | Fong et al. |
| 2013/0067373 A1 | 3/2013 | Weir et al. |
| 2013/0113717 A1* | 5/2013 | Van Eerd ................ G06F 3/016 345/173 |
| 2013/0113720 A1 | 5/2013 | Van Eerd et al. |
| 2013/0215018 A1* | 8/2013 | Xu ........................ G06F 3/0488 345/157 |
| 2013/0234936 A1* | 9/2013 | Urakawa ............ H04N 1/00411 345/157 |
| 2013/0262993 A1 | 10/2013 | Tolmasky et al. |
| 2014/0109004 A1* | 4/2014 | Sadhvani .............. G06F 3/0482 715/810 |
| 2014/0173484 A1 | 6/2014 | Hicks |
| 2015/0052430 A1 | 2/2015 | Dwan |
| 2015/0067570 A1 | 3/2015 | Yoon et al. |
| 2015/0130723 A1 | 5/2015 | Huang et al. |
| 2015/0135103 A1 | 5/2015 | Liu et al. |

FOREIGN PATENT DOCUMENTS

| | | |
|---|---|---|
| CN | 102893299 A | 1/2013 |
| CN | 103069376 A | 4/2013 |
| CN | 103076975 A | 5/2013 |
| CN | 103246474 A | 8/2014 |
| CN | 103309587 A | 9/2018 |
| EP | 2503442 | 9/2012 |
| WO | 2013067618 A1 | 5/2013 |

OTHER PUBLICATIONS

International Search Report and Written Opinion for PCT Patent Application No. PCT/US2014/064483, dated Mar. 16, 2015, 10 pages.

International Search Report and Written Opinion issued in PCT Application No. PCT/US2014/063966, dated Jan. 22, 2015, 12 pages.

Liu, et al, "Two Step Content Selection with Auto Content Categorization," U.S. Appl. No. 14/074,762, filed Nov. 8, 2013.

Karlson, et al., "ThumbSpace: Generalized One-Handed Input for Touchscreen-Based Mobile Devices", In Human-Computer Interaction—INTERACT, Sep. 10, 2007, pp. 324-328.

Albinsson, et al., "High Precision Touch Screen Interaction", In Proceedings of the SIGCHI Conference on Human Factors in Computing Systems, Apr. 5, 2003, pp. 105-112.

Wheatley, Mike, "Google Announces Changes to Solve Mobile Ads "Fat Finger" Problem", Published on: Dec. 14, 2012, Available at: http://www.searchenginejournal.com/google-announce-changes-to-solve-mobile-ads-fat-finger-problem/56456/.

Liu, et al., "Two Step Content Selection With Auto Content Categorization", unfiled US Patent Application.

Huang, et al., "Two Step Content Selection With Trajectory Copy", unfiled US Patent Application.

Ransiri, et al., "SmartFinger: An Augmented Finger as a Seamless 'Channel' between Digital and Physical Objects", In Proceedings of 4th Augmented Human International Conference, Mar. 7, 2013, pp. 5-8.

Abrek, Natascha, "Overview and Analysis of Multi-Touch Gestures", Published on: Apr. 6, 2012, Available at: http://campar.in.tum.de/personal/abrek/Downloads/main.pdf.

"International Preliminary Report on Patentability for PCT Application No. PCT/US2014/064483", dated Jan. 27, 2016, 19 Pages.

Non-Final Office Action for U.S. Appl. No. 14/074,762, dated Dec. 11, 2015, 21 pages.

Non-Final Office Action for U.S. Appl. No. 14/074,774, dated Sep. 8, 2015, 13 pages.

Response to the Non-Final Office Action for U.S. Appl. No. 14/074,774, filed Dec. 8, 2015, 15 pages.

Second Written Opinion Issued in PCT Application No. PCT/US2014/063966, dated Sep. 15, 2015, 7 Pages.

Response to the Final Office Action for U.S. Appl. No. 14/074,762, filed Sep. 6, 2016, 16 pages.

Response to the Final Office Action for U.S. Appl. No. 14/074,774, filed Sep. 6, 2016, 16 pages.

"International Preliminary Report on Patentability for PCT Application No. PCT/US2014/063966", dated Feb. 16, 2016, 13 Pages.

Response to the Non-Final Office Action for U.S. Appl. No. 14/074,762, filed Feb. 28, 2016, 14 pages.

Final Office Action for U.S. Appl. No. 14/074,762, dated May 31, 2016, 23 pages.

Guay, Matthew, "OCR Anything With OneNote 2007 and 2010", How-To-Geek, Apr. 8, 2010, 14 pages.

Final Office Action for U.S. Appl. No. 14/074,774, dated Mar. 17, 2016, 25 pages.

Final Office Action for U.S. Appl. No. 14/074,774, dated May 5, 2017, 27 pages.

"Response to the Non-Final Office Action for U.S. Appl. No. 14/074,774", filed Mar. 22, 2017, 10 pages.

Final Office Action for U.S. Appl. No. 14/074,762, dated May 25, 2017, 16 pages.

Response to the Final Office Action for U.S. Appl. No. 14/074,762, filed Jun. 30, 2017, 13 pages.

Response to the Final Office Action for U.S. Appl. No. 14/074,774, filed Jul. 2, 2017, 18 pages.

Advisory Action for U.S. Appl. No. 14/074,762, dated Jul. 19, 2017, 4 pages.

Notice of Allowance and Fees Due for U.S. Appl. No. 14/074,762, dated Aug. 8, 2017, 8 pages.

Response to the Advisory Action for U.S. Appl. No. 14/074,762, filed Jul. 24, 2017, 11 pages.

Advisory Action for U.S. Appl. No. 14/074,774, dated Jul. 20, 2017, 4 pages.

Non-Final Office Action for U.S. Appl. No. 14/074,774, dated Aug. 25, 2017, 31 pages.

Non-Final Office Action for U.S. Appl. No. 14/074,774, dated Nov. 30, 2016, 33 pages.

Non-Final Office Action for U.S. Appl. No. 14/074,762, dated Jan. 12, 2017, 24 pages.

Response to Non-Final Office Action for U.S. Appl. No. 14/074,762, filed Jan. 28, 2017, 12 pages.

(56) References Cited

OTHER PUBLICATIONS

Response to Official Communication Pursuant to Rules 161(1) and 162 EPC for European Patent Application No. 14819113.3, Filed Date: Jan. 25, 2017, 19 pages.
"Third Office Action and Search Report Issued in Chinese Patent Application No. 201480061383.1", dated Mar. 14, 2019, 11 Pages.
"Final Office Action Issued in U.S. Appl. No. 14/074,774", dated Jun. 11, 2018, 33 Pages.
"Office Action Issued in European Patent Application No. 14819113.3", dated Jun. 12, 2018, 8 Pages.
"First Office Action and Search Report Issued in Chinese Patent Application No. 201480061383.1", dated Mar. 29, 2018, 14 Pages.
"First Office Action and Search Report Issued in Chinese Patent Application No. 201480061463.7", dated Jun. 1, 2018, 20 Pages.
"Final Office Action Issued in U.S. Appl. No. 14/074,774", dated Jan. 11, 2019, 33 Pages.
"Second Office Action Issued in Chinese Patent Application No. 201480061383.1", dated Dec. 6, 2018, 11 Pages.
"Second Office Action Issued in Chinese Patent Application No. 201480061463.7", dated Feb. 20, 2019, 20 Pages.
"Third Office Action Issued in Chinese Patent Application No. 201480061463.7", dated Jun. 14, 2019, 06 Pages.
"Summon to Attend Oral Proceedings Issued in European Patent Application No. 14802287.4", Mailed Date: Aug. 20, 2019, 7 Pages.
"Appeal Brief for U.S. Appl. No. 14/074,774", filed Aug. 12, 2019, 23 pages.
"Notice of Allowance and Fees Due for U.S. Appl. No. 14/074,774", dated Sep. 18, 2019, 9 pages.
"Summons to Attend Oral Proceedings Issued in European Patent Application No. 14802287.4", Mailed Date: May 12, 2020, 8 Pages.

\* cited by examiner

102

122a

Once upon a time not so very long ago, in a kingdom not so very far away, there lived a kind woman who cared for sick people with her herbal concoctions. Her skill was very great and people from all over came to her to be healed.

One day a fine young lady on her fine dainty palfrey rode up with a flourish and knocked on the woman's door. "Open this door at once!" she said arrogantly. "I'm very important and I have no time to waste!"

The woman was not impressed and took her time answering the door. This just made the young lady even more impatient. She was just about purple in the face. 126

Once upon a time not so very long ago, in a kingdom not so very far away, there lived a kind woman who cared for sick people with her herbal concoctions. Her skill was very great and people from all over came to her to be healed.

One day a fine young lady on her fine dainty palfrey rode up with a flourish and knocked on the woman's door. "Open this door at once!" she said 150 arrogantly. "I'm very important and I have no time to waste!" 152

The woman was not impressed and took her time answering the door. This just made the young lady even more impatient. She was just about purple in the face. I'm afraid she was not the most tolerant of people in the world and being vexed made her even more intolerant. She decided to teach the healer a lesson.

Once upon a time not so very long ago, in a kingdom not so very far away, there lived a kind woman who cared for sick people with her herbal concoctions. Her skill was very great and people from all over came to her to be healed.

One day a fine young lady on her fine dainty palfrey rode up with a flourish and knocked on the woman's door. "Open this door at once!" she said arrogantly. "I'm very important and I have no time to waste!"

130b

The woman was not impressed and took her time answering the door. This just made the young lady even more impatient. She was just about purple in the face.

Once upon a time not so very long ago, in a kingdom not so very far away, there lived a kind woman who cared for sick people with her herbal concoctions. Her skill was very great and people from all over came to her to be healed.

One day the woman, whose name was Gremila, heard a knock on the door. "Open this door at once!" she heard. "I'm very important and I have no time to waste!"

128

The woman was not impressed and took her time answering the door. This just made the young lady even

Once upon a time not so very long ago, in a kingdom not so very far away, there lived a kind woman who cared for sick people with her herbal concoctions. Her skill was very great and people from all over came to her to be healed.

One day a fine young man on his fine feisty stallion rode up with a flourish and knocked on the woman's door. "Open this door at once!" he said arrogantly. "I'm very important and I have no time to waste!"

her time answering the door. This just made the young lady even more impatient. 139c

Once upon a time not so very long ago, in a kingdom not so very far away, there lived a kind woman who cared for sick people with her herbal concoctions. Her skill was very great and people from all over came to her to be healed.

One day the woman, whose name was Gremila, heard a knock on the door. "Open this door at once!" she heard. "I'm very important and I have no time to waste!"

Gremila was slow answering the door. This just made the young lady even more impatient.

Once upon a time not so very long ago, in a kingdom not so very far away, there lived a kind woman who cared for sick people with her herbal concoctions. Her skill was very great and people from all over came to her to be healed.

One day a fine young man on his fine feisty stallion rode up with a flourish and knocked on the woman's door. "Open this door at once!" he said arrogantly. "I'm very important and I have no time to waste!"

Gremila was slow answering the door. This just made the young lady even more impatient. 124a

TWO STEP CONTENT SELECTION

CROSS-REFERENCE TO RELATED APPLICATIONS

The application is related in subject matter to co-pending U.S. patent application Ser. No. 14/074,762 entitled "TWO STEP CONTENT SELECTION WITH AUTO CONTENT CATEGORIZATION", filed on Nov. 8, 2013. The application is related in subject matter to co-pending U.S. patent application Ser. No. 14/074,774 entitled "TWO STEP CONTENT SELECTION WITH TRAJECTORY COPY", filed on Nov. 8, 2013.

BACKGROUND

In many computer programs, selecting content involves the use of a selection object such as a mouse, touchpad, finger, stylus, etc. Selecting content is an example of a user operation that can be difficult under certain circumstances. For example, when the selection object (e.g., someone's finger) is larger than the selection zone, (e.g., an area on a touchscreen) it may become difficult to precisely select desired content. Similarly, environmental conditions (e.g., vibration or other movement) or motor impairment of the user can make precise selection of content difficult.

SUMMARY

In a first step of a two step content selection operation, content can be selected by detecting movement of a content selection object with respect to a computing device. The selection area can be calculated based on the object movement that is detected. The selection area can be calculated by determining a rectangular area derived from coordinates of a start selection point and an ending release point of the content selection object. The content within the selection area can be selected. The content (i.e., initial content) selected in the first step of the content selection operation can be copied into a second display area. All or part of the initial content can be enlarged.

A second step of the content selection operation can be performed. The second step of the content selection operation can be used to precisely select content. The second step of the content selection operation can select a subset of the content selected in the first step of the content selection operation. Initiation of the second step of the selection operation can be detected by detecting movement of a content selection object with respect to the second display area. The second step of the selection operation can be detected by detecting a start selection indication and an end selection indication. The content (i.e., final content) selected by the second step of the content selection operation can be pasted into a specified destination (target). The content selected by the second step of the content selection operation can be edited before being pasted into the specified destination.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings:

FIG. 1b illustrates an example of source content displayed on a computing device in accordance with aspects of the subject matter described herein;

FIG. 1d illustrates an example of the content of FIG. 1c in which a selection area is calculated in accordance with aspects of the subject matter described herein;

FIG. 1e illustrates another example of FIG. 1b in which a start selection point and an ending release point have been detected in accordance with aspects of the subject matter described herein;

FIG. 1h illustrates the example of FIG. 1g in which a start selection point has been detected for the second step of the content selection operation in accordance with aspects of the subject matter disclosed herein;

FIG. 1j illustrates the result of a paste operation in accordance with aspects of the subject matter disclosed herein;

FIG. 1k illustrates editing results of the second step of the content selection operation in accordance with aspects of the subject matter disclosed herein;

FIG. 1l illustrates the result of an edit and paste operation in accordance with aspects of the subject matter disclosed herein;

DETAILED DESCRIPTION

Overview

Currently, selection of content is typically based on precisely indicating the content to be selected by indicating a beginning and ending position in the content. For example, a user typically selects content by indicating a start position in the content and an end position in the content. The content that is selected is the content that includes the content at the indicated start position, the content at the indicated end position and the content that exists between the indicated start position and the indicated end position.

In accordance with aspects of the subject matter described herein, content from a source location can be selected by detecting movement of a selection object across an area (e.g., a surface) of a computing device displaying the source content in a first display area. The movement of the selection object can be used to calculate a selection area. The content within the calculated selection area can be selected. A target (e.g., file, spreadsheet, image, etc.) to which the copied content is to be pasted can be identified. A paste location at which content will be pasted within the target can be identified. The target can be displayed in a first target display area. The content within the calculated selection area can be copied into a second display area. The copied content can be enlarged and all or part of the enlarged content can be displayed in the second display area. A beginning location and an ending location within the second display area can be indicated to select a portion of the content selected in the first step of the content selection operation that is to be pasted into the target. The content selected in the second step of the content selection operation can be pasted into the target at the paste location. In accordance with aspects of the subject matter described herein, the content selected in the second step of the content selection operation can be edited before being pasted into the target.

Two Step Content Selection

Figure 1A:
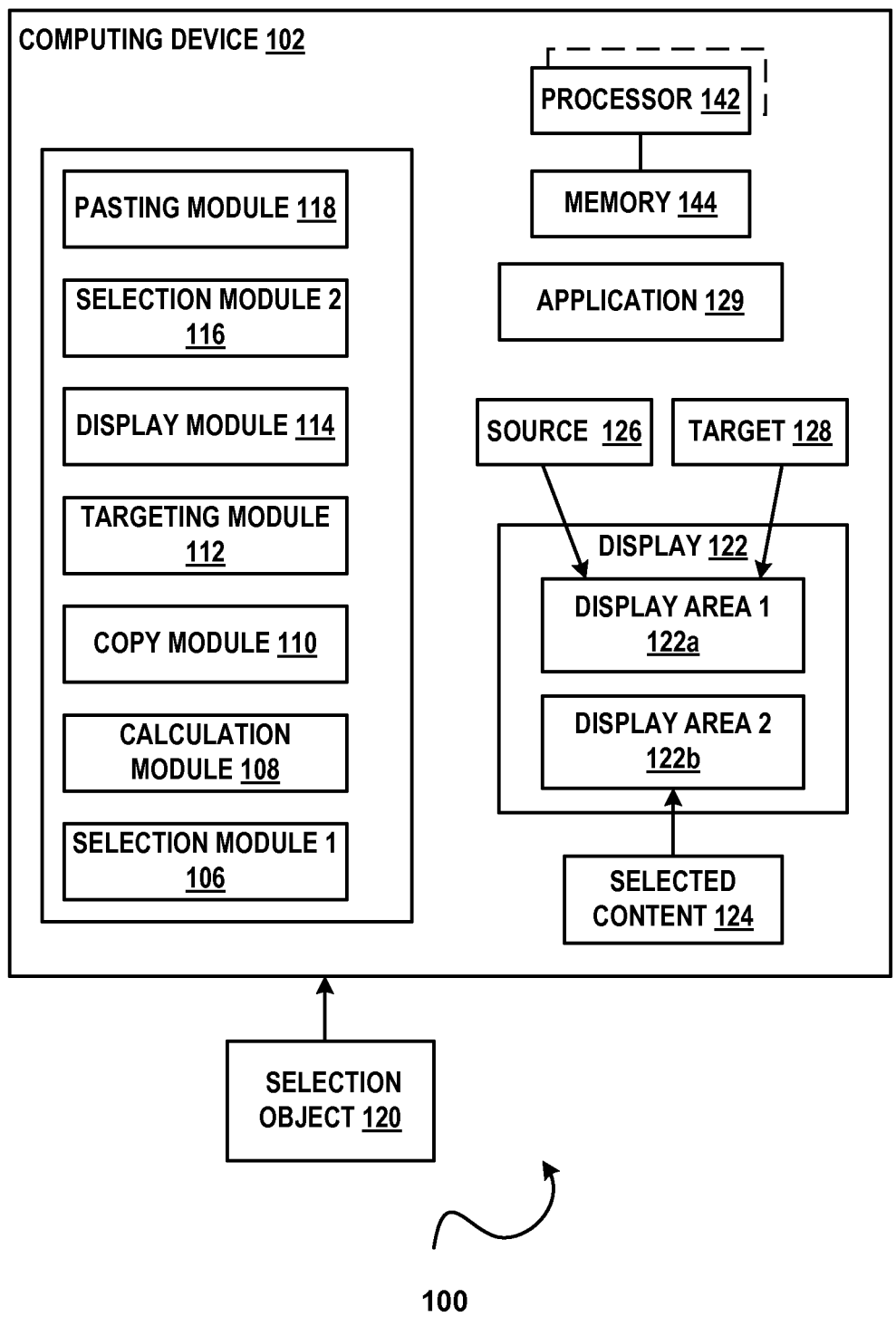
FIG. 1a illustrates an example of a system 100 that enables two step content selection in accordance with aspects of the subject matter described herein.

FIG. 1a illustrates a block diagram of an example of a system 100 that enables two step content selection. In the first step of the two steps, content from a source can be selected. In the second step of the two steps, all or some of the content selected in the first step can be selected. The content selected in the second step of the content selection operation can be pasted into a target in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 100 can include one or more computing devices such as, for example, computing device 102. Contemplated computing devices include but are not limited to desktop computers, tablet computers, laptop computers, notebook computers, personal digital assistants, smart phones, cellular telephones, mobile telephones, and so on. A computing device such as computing device 102 can include one or more processors such as processor 142, etc., and a memory such as memory 144 that communicates with the one or more processors.

System 100 can include one or more program modules represented in FIG. 1a by one or more of the following: one or more first selection modules represented in FIG. 1a by selection module 1 106 that selects content in a first step of a two step content selection operation, one or more calculation modules represented in FIG. 1a by calculation module 108, one or more copying modules represented in FIG. 1a by copy module 110, one or more targeting modules represented in FIG. 1a by targeting module 112, one or more display modules represented in FIG. 1a by display module 114, one or more second selection modules represented in FIG. 1a by selection module 2 116 that selects content in a second step of the two step content selection operation, and/or one or more pasting modules represented in FIG. 1a by pasting module 118. Module functions can be combined. For example, it is possible for one module to be able to perform both steps of the two step content selection operation and so on.

It will be appreciated that one or more program modules (e.g., selection module 1 106, calculating module 108, etc.) can be loaded into memory 144 to cause one or more processors such as processor 142, etc. to perform the actions attributed to the respective program module(s). It will be appreciated that computing device 102 may include other program modules known in the arts but not here shown.

System 100 can include one or more displays represented in FIG. 1a by display 122. Display 122 can be a touch screen. Display 122 can be a traditional display screen. Display 122 can be a high-resolution display. Display 122 may display content. "Content" as used herein can include but is not limited to: text data, image data, spreadsheet data (e.g., such as but not limited to a MICROSOFT's EXCEL® spreadsheet), calendar data (e.g., such as but not limited to a MICROSOFT's OUTLOOK® calendar) or any other content. Display 122 can include one or more display areas, represented in FIG. 1a by display area 1 122a and display area 2 122b. It will be appreciated that although two display areas are illustrated, the concept described is not so limited. Any number of display areas are contemplated.

A first display area such as, for example, display area 1 122a of FIG. 1a can display all or a portion of content from a content source, such as source 126. Display area 1 122a can display all or a portion of content from a content target, such as target 128. A second display area such as display area 2 122b can display selected content, illustrated in FIG. 1a as selected content 124. The content displayed in display area 2 122b can be enlarged or magnified. Selected content 124 can be content selected by a first step of a content selection operation. Selected content 124 can be content selected by a second step of a content selection operation. Selected content 124 can be selected content that has been edited.

In accordance with some aspects of the subject matter described herein, application 129 can be a word processing application (e.g., including but not limited to MICROSOFT's WORD®), a calendar application (e.g., including but not limited to MICROSOFT's OUTLOOK®), a spreadsheet application (e.g., including but not limited to MICROSOFT's EXCEL®), an image processing application or any application that manipulates content. Application 129 may be capable of editing content such as but not limited to selected content 124.

In accordance with some aspects of the subject matter described herein, a first display area such as display area 1 122a can display all or part of content from which a first selection is made, (e.g., a source from which content is selected) in the first step of a two step content selection operation. Display area 1 122a can display all or part of content into which content selected by the two step content selection operation is pasted. The content into which the content selected by the two step content selection operation is pasted can be a target such as target 128 for the pasting operation in which content selected in the second step of the two step content selection operation is pasted into the target. FIG. 1b illustrates an example of source content (e.g., source 126) displayed in display area 1 122a on a computing device 102. A second display area such as display area 2 122b can display the content selected by the first step of the two step content selection operation. The second display area, display area 2 122b can display the content selected by the first step of the two step content selection operation to facilitate selection of content in the second step of the content selection operation. The second step of the content selection operation can facilitate selection of a subset of the content selected by the first step of the content selection operation. In the second display area, all or part of the content (i.e., initial content) selected in the first step of the content selection operation, content (i.e., final content) selected in the second step of the content selection operation, or edited content can be displayed. The second display area can be a display for a content editor that enables editing of the content selected in the second step of the content selection operation. The second display area can be a display for pasting content selected in the second step of the content selection operation into a target.

Selection module 1 106 can receive input that indicates content to be selected. Selection module 1 106 can select the indicated content in a first step of a two step content selection operation. Execution of selection module 1 106 can be triggered by receiving a menu option selection, by receiving a voice command, by detecting a user gesture or in any way as is known in the art now or as is subsequently conceived.

Figure 1C:
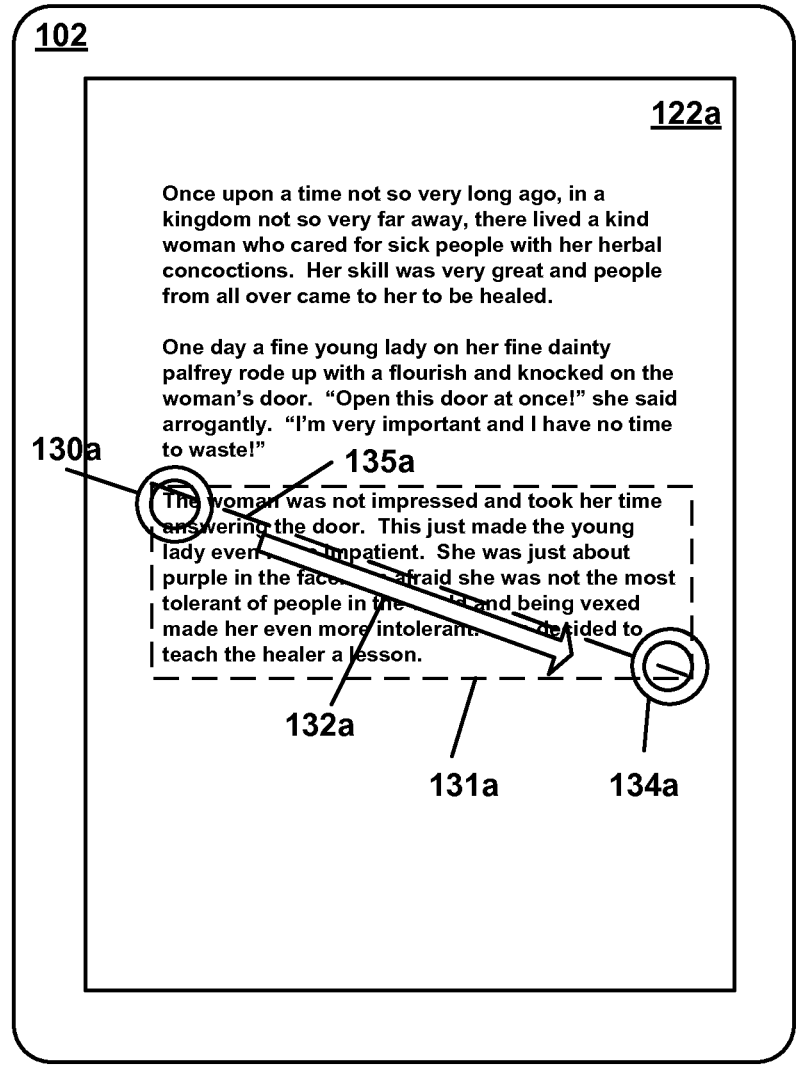
FIG. 1c illustrates the example of FIG. 1b in which a start selection point and an ending release point for the first step of two step content selection have been detected in accordance with aspects of the subject matter described herein.

Content to be selected by selection module 1 106 can be indicated by using a selection object such as the selection object represented in FIG. 1*a* by selection object 120. A selection object can be any input device including but not limited to a mouse, trackball, stylus, or other suitable object. A selection object can be a body part such as a finger or other body part. Content to be selected can be indicated by, for example, using a finger on a touch screen. Selection module 1 106 may detect a selection operation by detecting movement of a selection object in contact with a touch-perceiving surface of the computing device. Selection module 1 106 may detect a selection operation by detecting proximity of a selection object to a surface of the computing device. Selection module 1 106 may detect a selection operation by detecting a beam of light such as a laser. Selection module 1 106 can determine coordinates of a start selection point and an ending release point as illustrated in FIG. 1*c* in which a start selection point 130*a* and an ending release point 134*a* have been detected. The content selected by selection module 1 106 in response to selection information can be determined by calculation module 108.

Calculation module 108 may receive selection information (i.e., first selection information) from selection module 1 106. The selection information received from selection module 1 106 can be used to calculate a content selection area that is based on the movement of the selection device on or in proximity to a surface of a computing device (e.g., movement of a finger on a touch screen). The content selection area can be calculated using the four vertices of a rectangle derived from the coordinates of a start selection point (e.g., start selection point 130*a*) and an ending release point (e.g., ending release point 134*a*). The start selection point can refer to the location on a display area 1 122*a* at which contact with a selection object is first detected. The start selection point can refer to the location in a file displayed on a display area 1 122*a* to which a selection object points. Suppose for example, that display area 1 122*a* displays content from source 126. Content from source 126 or a portion or subset of content from source 126 can be selected by placing a selection object (e.g., a finger) on the display (e.g., a touch screen) at coordinates $(x_1, y_1)$ at which the desired content is displayed. Without breaking contact between the selection object and the display surface, the selection object can be moved across the surface of the display to a second point at coordinates $(x_2, y_2)$. "Without breaking contact" means that contact between the selection object and the computing device is maintained in an uninterrupted fashion. In FIG. 1*c*, the movement of the selection object across the display surface is illustrated by arrow 132*a*. At the second point, $(x_2, y_2)$, contact between the selection object and the surface of the display can be broken. The point at which the selection object is no longer detected by the selection module is referred to as the ending release point illustrated in FIG. 1*c* by ending release point 134*a*.

A diagonal line from the start selection point to the ending release point (e.g., diagonal line 135*a* in FIG. 1*c*), can be used to create a rectangle (e.g., rectangle 131*a*) having four vertices calculated from the coordinates of the start selection point and the ending release point. That is, a rectangle can be formed, for example, using the coordinates (minimum x, maximum y) 150, (minimum x, minimum y) 151, (maximum x, maximum y) 152 and (maximum x, minimum y), 153 as illustrated in FIG. 1*d* where (minimum x, maximum y) is derived from the start selection point and (maximum x, minimum y) is derived from the ending release point. As illustrated in FIG. 1*e*, if the x coordinate of the start selection point (e.g., start selection point 130*b*) is not at the left edge of the content, the minimum x coordinate can be modified so that the content selected extends to the left edge of the content. Similarly, if the x coordinate of the ending release point (e.g., ending release point 134*b*) is not at the right edge of the content, the maximum x coordinate can be modified so that the content selected extends to the right edge of the content to form rectangle 131*b*. The content in the selection area may be highlighted or distinguished visually in some way from unselected content in display area 1 122*a*.

Selection module 1 106 can select the content in the selection area calculated by the calculation module 108. The logic that is used to calculate the selection area can be provided as heuristics including but not limited to rules such as a rule to determine the number of lines to select given a single touch point (e.g., a starting point or ending point of a finger trajectory). Rules can be customized for the particular user. For example, for a user having a larger finger, three lines of text may be included while two lines of text may be included for the same movement made by a user having an average finger. When a smaller font is used, the number of lines included may increase so that the selection made can be customized to the display size, screen resolution, font size, zoom setting and so on. Other rules can specify automatically extending to the end of a word, paragraph, subsection of a page, page, chapter, section, etc.

Figure 1F:
FIG. 1f illustrates an example of a paste location in a target in accordance with aspects of the subject matter described herein.

Copy module 110 can make a copy of the content selected by selection module 1 106 (i.e., initial content). Copying may be triggered by the breaking of contact or loss of detection of proximity between the selection object and the computing device. Targeting module 112 can receive a target 128 (e.g., a file, etc.) into which content selected by selection module 2 116 (i.e., final content) can be pasted, or edited and pasted. Targeting module 112 can instantiate an instance of an associated application such as application 129, if appropriate. Targeting module 112 can direct display module 114 to load the target 128 into display area 1 122*a*. For example, suppose the source 126 and the target 128 are word processing documents. Targeting module 112 may instantiate a new instance of MICROSOFT's WORDED, and direct display module 114 to display target 128 in display area 1 122*a*, as illustrated in FIG. 1*f*, in which display area 1 122*a* displays content of target 128. An indication of where the content to be pasted into target 128 can be received. This is illustrated in FIG. 1*f* by paste location 138.

Figure 1G:
FIG. 1g illustrates the example of FIG. 1f in which a second display area overlays the target display in accordance with aspects of the subject matter disclosed herein.
Figure 1I:
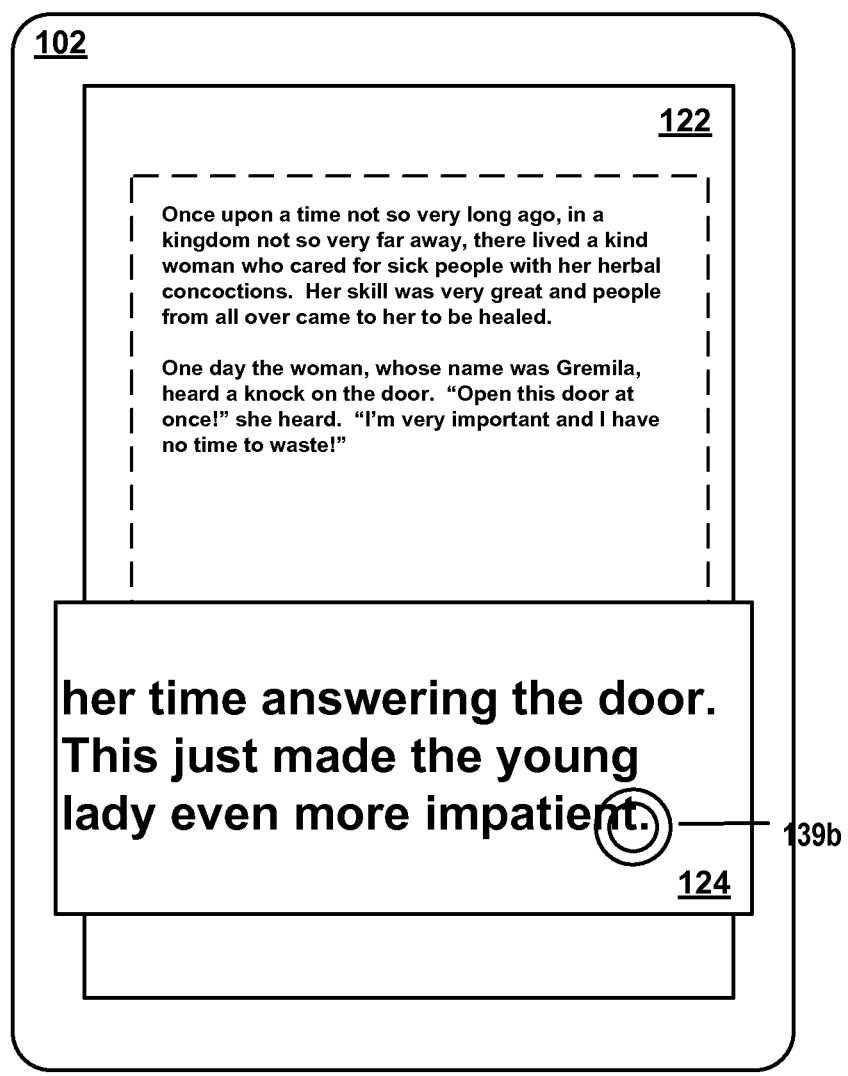
FIG. 1i illustrates the example of FIG. 1h in which an end selection point has been detected for the second step of the content selection operation in accordance with aspects of the subject matter disclosed herein.

Display module 114 can display in a second display area, display area 2 122*b*, the content copied by the copy module 110, selected content 124, as illustrated in FIG. 1*g*. Display module 114 can display the second display area, display area 2 122*b*, overlaying display area 1 122*a*. The content copied by the copy module can be enlarged in the second display area. Selection module 2 116 can receive selection input that identifies the subset of the content to select by receiving a second start selection point and a second end selection point. Alternatively, the coordinates of a start selection point and an ending release point as described above with respect to selection module 1 106 can be used to calculate a selection area. FIG. 1h illustrates receiving selection input that identifies a second start selection point, start selection point 139a. If all of the selected content is not displayed in display area 2 122b, a scrolling operation can be initiated, illustrated in FIG. 1i. In response to receiving a second end selection (e.g. end selection 139b) the indicated content can be pasted into the target 128 at the specified location (e.g., paste location 138, as illustrated in FIG. 1f). Results of the paste operation are displayed in FIG. 1j in which "her time answering the door. This just made the young lady even more impatient." 139c has been pasted into the target 128.

Optionally the content selected by the second step of the content selection operation can be edited before being pasted into the target, as shown in FIG. 1k. In FIG. 1k, selected content 124 "her time answering the door. This just made the young lady even more impatient." illustrated in FIG. 1i, has been edited to read "Gremila was slow answering the door. This just made the young lady even more impatient." edited content 124a. An appropriate content editor can be called to perform the editing process. Results of edit and paste operations are displayed in FIG. 1l.

Figure 2:
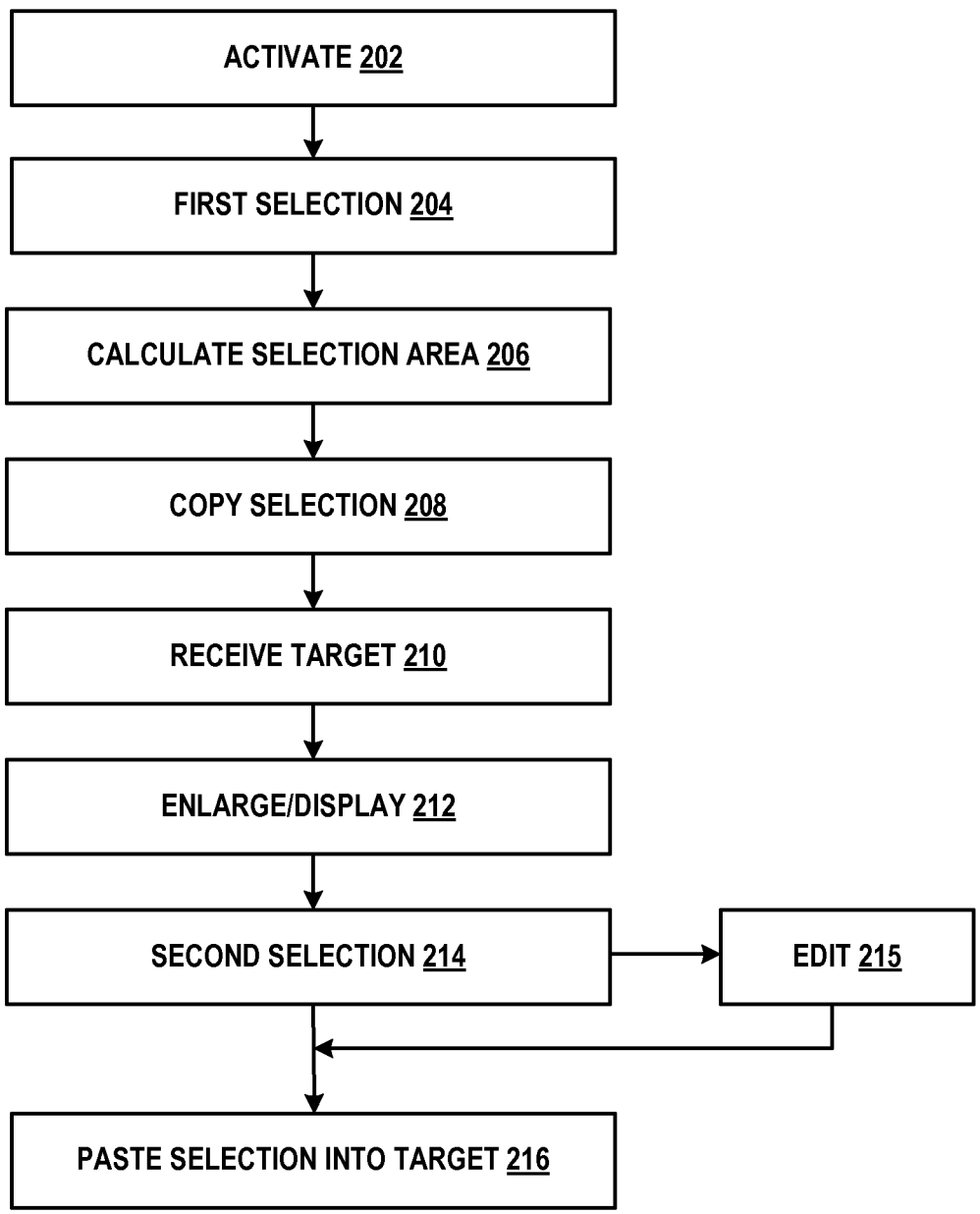
FIG. 2 illustrates an example of a method 200 that enables two step content selection in accordance with aspects of the subject matter disclosed herein.

FIG. 2 illustrates an example of a method 200 that enables two step content selection in accordance with aspects of the subject matter described herein. The method described in FIG. 2 can be practiced by a system such as but not limited to the one described with respect to FIG. 1a. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed.

At operation 202, a first step of a content selection and/or copying operation can be activated on a computing device in some way. Non-limiting examples of activation of such a selection and/or copying operation can include: using a physical movement, using a voice command or in any other suitable way activating a selection and/or copying operation. Physical movements include but are not limited to one or more actions including pressing, pressing and holding, pressing and holding for a particular time period, etc. one or more portions of the computing device. The portion or portions of the computing device that receives the action may be a screen or display portion, keys on a keyboard, a panel, one or more buttons on the computing device, etc.

At operation 204, content to be selected can be indicated in a first step of a content selection operation. Content to be selected can be indicated by, for example, using a stylus, mouse or other input device to select content. Content to be selected can be indicated by, for example, using a finger on a touch screen to select initial content, as described more fully above.

At operation 206, a selection area, the area from which content is selected, can be calculated. In accordance with some aspects of the subject matter described herein, the content area to be selected is calculated based on the movement of an input device on a portion of a computing device (e.g., movement of a finger on a touch screen). The content area can be calculated using the four vertices of a rectangle derived from the coordinates of the start selection point and the ending release point. Suppose for example, a user selects content by placing an input device (e.g., a finger) on a display device (e.g., a touchscreen) at coordinates (minimum x, maximum y) and without breaking contact between input device and display device, moves the input device across the surface of the display device to a second point at coordinates (maximum x, minimum y), at which contact between the input device and the surface of the display device is broken. The point at which the input device is no longer detected by the selection module is referred to as the ending release point.

A diagonal line from the start selection point to the ending release point can be used to create a rectangle having four vertices calculated from the coordinates of the start selection point and the ending release point. That is, a rectangle can be formed, for example, using the coordinates (minimum x, maximum y), (minimum x, minimum y), (maximum x, maximum y) and (maximum x, minimum y), where (minimum x, maximum y) is the start selection point and (maximum x, minimum y) is the ending release point. If the x coordinate of the start selection point is not at the left edge of the content, the minimum x coordinate can be modified so that the content selected extends to the left edge of the content. Similarly, if the x coordinate of the ending release point is not at the right edge of the content, the maximum x coordinate can be modified so that the content selected extends to the right edge of the content. The selected content may be highlighted or distinguished visually in some way from unselected content.

At operation 208 content within the selection area can be copied. The copy operation may be triggered by the breaking of contact between the input device and the computing device. At operation 210 a target can be indicated by a user. The target can identify the application that is launched. For example, if a MICROSOFT WORD® document is identified, a WORD editor can be launched. If a MICROSOFT EXCEL® spreadsheet file is identified, EXCEL can be launched and so on. At operation 212 the copied content can be displayed in a second display area associated with the application. Some or all of the copied content can be enlarged. At operation 214 a subset of the initial content comprising final content, can be selected in a second step of the content selection operation by indicating a second start selection point and a second end selection point. Content between and including the second start selection point and the second end selection point can be pasted into the target at the paste location at operation 216. Alternatively, the content can be edited at operation 215 before pasted into the target at the paste location at operation 216.

Example of a Suitable Computing Environment

Figure 3:
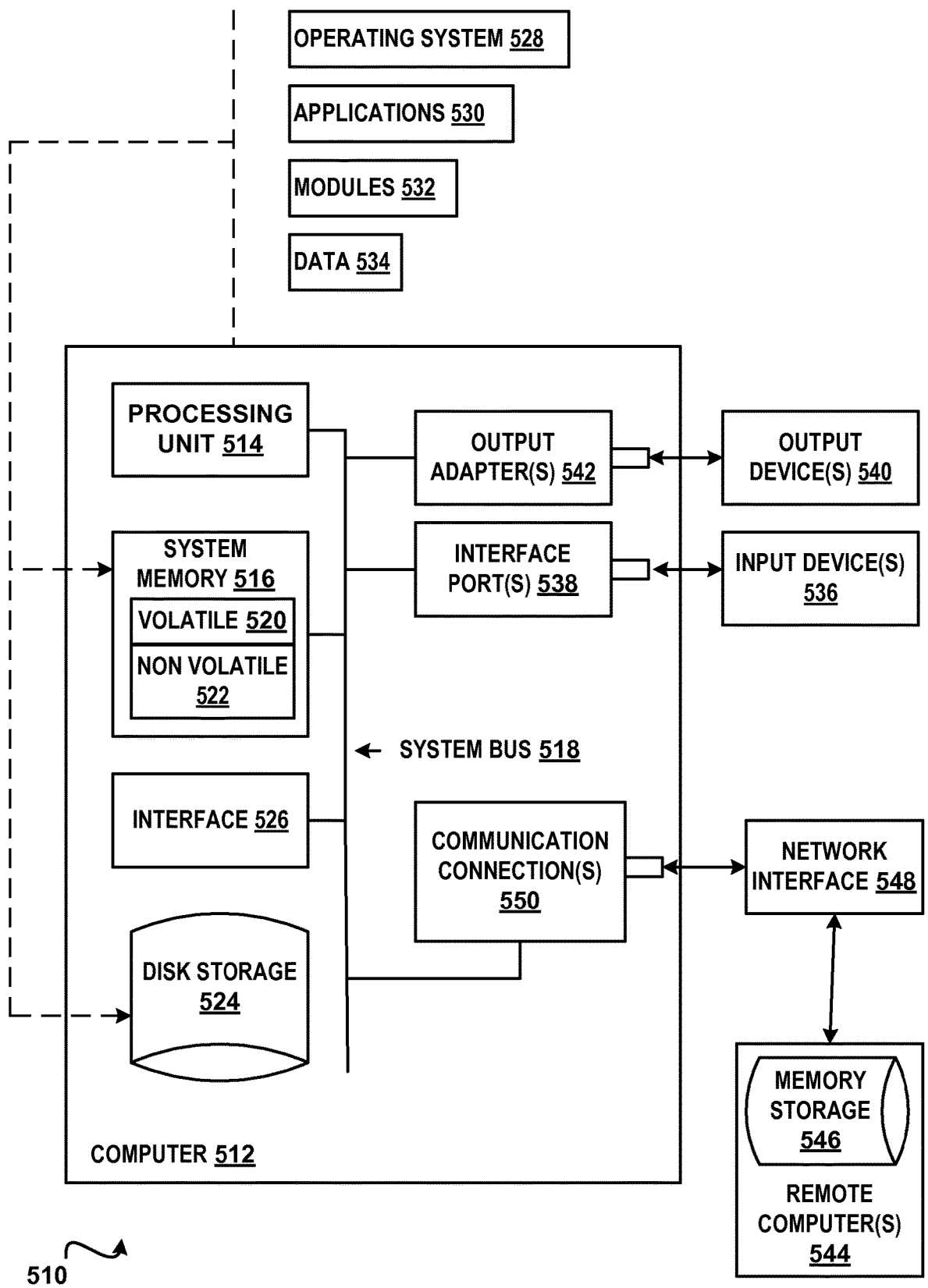
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one processor; and
   a display connected to the at least one processor, the display configured to display source content;
   the at least one processor configured to select first content from the source content displayed on the display in a first selection area of the display based on a first detected movement of a content selection object across a surface of the display, the first selection area being specified by the first detected movement of the content selection object across the surface of the display, the first detected movement of the content selection object being a diagonal line across the surface of the display that begins at a first start selection point and ends at a first ending release point with contact between the content selection object and the surface of the display being uninterruptedly maintained from the first start selection point to the first ending release point;
   the display further configured to enlarge the first content selected from the source content, a release of the content selection object from the surface of the display at the first ending release point of the first detected movement that specifies the first selection area causes the first content to be enlarged on the display; and
   the at least one processor further configured to:
      select second content from the first content enlarged on the display in a second selection area of the display based on a second detected movement of the content selection object across the surface of the display, initiation of selection of the second content from the first content enlarged on the display being responsive to detection of the second detected movement of the content selection object, the second selection area being specified by the second detected movement of the content selection object across the surface of the display, the second detected movement of the content selection object begins at a second start selection point and ends at a second ending release point with contact between the content selection object and the surface of the display being uninterruptedly maintained from the second start selection point to the second ending release point; and
      copy the second content selected from the first content, a release of the content selection object from the surface of the display at the second ending release point of the second detected movement that specifies the second selection area causes the second content to be copied.

2. The system of claim 1, the at least one processor further configured to:
   detect the first start selection point and the first ending release point of the first detected movement of the content selection object; and
   determine the first content to be selected from the source content displayed on the display based on the first start selection point and the first ending release point.

3. The system of claim 2, the at least one processor further configured to:
   calculate the first selection area, wherein, to calculate the first selection area, the at least one processor is further configured to:
      determine an x coordinate and a y coordinate of the first start selection point;
      determine an x coordinate and a y coordinate of the first ending release point;
      use the x coordinate of the first start selection point as a first x coordinate of the first selection area and the y coordinate of the first start selection point as a first y coordinate of the first selection area;
      use the x coordinate of the first ending release point as a second x coordinate of the first selection area and the y coordinate of the first ending release point as a second y coordinate of the first selection area;
      when the first x coordinate of the first selection area is not at a left edge of the source content, modify the first x coordinate of the first selection area to be at the left edge of the source content; and
      when the second x coordinate of the first selection area is not at a right edge of the source content, modify the second x coordinate of the first selection area to be at the right edge of the source content;
   wherein the at least one processor is configured to select the source content within the first selection area as the first content.

4. The system of claim 1, wherein, to select the second content from the first content enlarged on the display, the at least one processor is further configured to:
   detect the second start selection point and the second ending selection point when the first content is enlarged on the display; and
   select the second content based on the second start selection point and the second ending selection point.

5. The system of claim 1, the at least one processor further configured to:
   paste the second content selected from the first content into a specified target at a specified paste location, the release of the content selection object from the surface of the display at the second ending release point of the second detected movement causes the second content to be pasted into the specified target at the specified paste location.

6. The system of claim 1, wherein:
   the display further configured to display the second content as copied in a display area of a content editor, the release of the content selection object from the surface of the display at the second ending release point of the second detected movement causes the second content to be displayed in the display area of the content editor; and the at least one processor further configured to:
edit the second content displayed in the display area of the content editor to create edited second content; and
paste the edited second content into a specified target at a specified paste location.

7. The system of claim 1, the first selection area being set using a heuristic to determine a number of lines of the source content to include in the first selection area, the heuristic being a function of a parameter of the display, the parameter of the display comprises at least one of a display size, a screen resolution, a font size, or a zoom setting.

8. A method comprising:
causing source content to be displayed on a display;
receiving, by a processor of a computing device, a first indication of first content to be selected from the source content displayed in a first display area on the display, the first content indicated by a first movement of a selection object across a surface of the display, the first movement of the selection object across the surface of the display having a first start selection point, a first ending release point, and a first line that is diagonal across the surface of the display extending between the first start selection point and the first ending release point;
calculating a first selection area, the first selection area being calculated using a heuristic to determine a number of lines of the source content to include in the first selection area based on the first start selection point and the first ending release point, the heuristic being a function of a parameter of the display;
causing the first content selected from the source content to be enlarged in a second display area overlaying the first display area, a release of the selection object from the surface of the display at the first ending release point of the first movement causes the first content from the first selection area to be enlarged in the second display area on the display;
receiving a second indication of second content to be selected from the first content enlarged on the display in the second display area, the second content being a portion of the first content, the second content indicated by a second movement of the selection object across the surface of the display, the second movement of the selection object across the surface of the display having a second start selection point, a second ending release point, and a second line extending between the second start selection point and the second ending release point;
calculating a second selection area based on the second start selection point and the second ending release point; and
copying the second content selected from the first content, a release of the selection object from the surface of the display at the second ending release point of the second movement causes the second content from the second selection area to be copied.

9. The method of claim 8, further comprising:
pasting the second content selected from the first content into a target at a specified paste location, the release of the selection object from the surface of the display at the second ending release point of the second movement causes the second content to be pasted into the target at the specified paste location.

10. The method of claim 8, further comprising:
causing the second content as copied to be displayed in a display area of a content editor, the release of the selection object from the surface of the display at the second ending release point of the second movement causes the second content to be displayed in the display area of the content editor;
editing the second content displayed in the display area of the content editor to create edited second content; and
pasting the edited second content into a specified target at a specified paste location.

11. The method of claim 8, wherein the first selection area is a rectangle, and wherein calculating the first selection area based on the first start selection point and the first ending release point further comprises:
extending the first selection area by setting a minimum x coordinate for the first content to an x coordinate for a left edge of the source content and by setting a maximum x coordinate for the first content to an x coordinate for a right edge of the source content.

12. The method of claim 8, wherein contact between the selection object and the surface of the display is uninterruptedly maintained from the first start selection point to the first ending release point, and contact between the selection object and the surface of the display is uninterruptedly maintained from the second start selection point to the second ending release point.

13. The method of claim 8, the parameter of the display comprises at least one of a display size, a screen resolution, a font size, or a zoom setting.

14. A computer-readable storage medium comprising computer-readable instructions which when executed cause at least one processor of a computing device to:
cause source content to be displayed on a touchscreen display;
select initial content from the source content displayed on the touchscreen display in a first selection area of the touchscreen display based on a first detected contact of a content selection object across a surface of the touchscreen display, the initial content selected based on the first detected contact of the content selection object across the surface of the touchscreen display, the first detected contact of the content selection object being a diagonal line across the surface of the touchscreen display that begins at a first start selection point and ends at a first ending release point with the first detected contact between the content selection object and the surface of the touchscreen display being uninterruptedly maintained from the first start selection point to the first ending release point, the first selection area being set using a heuristic to determine a number of lines of the source content to include in the first selection area, the heuristic being a function of a parameter of the touchscreen display;
cause the initial content selected from the source content to be enlarged on the touchscreen display, a release of the content selection object from the surface of the touchscreen display at the first ending release point of the first detected contact that specifies the first selection area triggers the initial content to be enlarged on the touchscreen display;
select final content from the initial content enlarged on the touchscreen display in a second selection area of the display based on a second detected contact of the content selection object across the surface of the touchscreen display, the final content being selected from the initial content based on the second detected contact of the content selection object across the surface of the touchscreen display that begins at a second start selection point and ends at a second ending release point with the second detected contact between the content selection object and the surface of the touchscreen display being uninterrupted maintained from the second start selection point to the second ending release point; and copy the final content selected from the initial content, a release of the content selection object from the surface of the touchscreen display at the second ending release point of the second detected contact causes the final content to be copied.

15. The computer-readable storage medium of claim 14, comprising further computer-readable instructions which when executed cause the at least one processor to:

paste the final content as copied into a target at a specified point in the target, the release of the content selection object from the surface of the touchscreen display at the second ending release point of the second detected contact causes the final content to be pasted into the target at the specified point in the target.

16. The computer-readable storage medium of claim 14, comprising further computer-readable instructions which when executed cause the at least one processor to:

cause the final content as copied to be displayed in a display area of a content editor, the release of the content selection object from the surface of the touchscreen display at the second ending release point of the second detected contact causes the final content to be displayed in the display area of the content editor;

edit the final content displayed in the display area of the content editor to create edited final content; and paste the edited final content into a target at a specified point in the target.

17. The computer-readable storage medium of claim 14, comprising further computer-readable instructions which when executed cause the at least one processor to:

cause a target to be displayed in a first display area of the touchscreen display; and cause the initial content as enlarged to be displayed in a second display area of the touchscreen display.

18. The computer-readable storage medium of claim 17, comprising further computer-readable instructions which when executed cause the at least one processor to:

select the final content from the initial content as enlarged in the second display area of the touchscreen display;

edit the final content in the second display area of the touchscreen display; and insert edited final content into the target in the first display area of the touchscreen display.

19. The computer-readable storage medium of claim 14, comprising further computer-readable instructions which when executed cause the at least one processor to:

determine the first selection area based on the first start selection point and the first ending release point, the first selection area being extended to a left edge of the source content and a right edge of the source content;

wherein the source content within the first selection area is selected as the initial content.

20. The computer-readable storage medium of claim 14, the parameter of the display comprises at least one of a display size, a screen resolution, a font size, or a zoom setting.

* * * * *